United States Patent [19]

Sakashita et al.

[11] Patent Number: 5,291,305
[45] Date of Patent: Mar. 1, 1994

[54] FACSIMILE NETWORK SYSTEM CAPABLE OF CARRYING OUT BROADCAST COMMUNICATION

[75] Inventors: Hajime Sakashita; Yoshiaki Komachi; Takashi Kamikura; Ryuji Hosaka; Naoharu Kido, all of Saitama, Japan

[73] Assignee: Fuji Xerox Co., Ltd., Tokyo, Japan

[21] Appl. No.: 739,323

[22] Filed: Aug. 1, 1991

[30] Foreign Application Priority Data

Aug. 3, 1990 [JP] Japan .................................. 2-206961
Aug. 3, 1990 [JP] Japan .................................. 2-206962

[51] Int. Cl.⁵ .......................... H04N 1/00; H04N 1/40
[52] U.S. Cl. ................................. 358/444; 358/400; 358/403
[58] Field of Search ............... 358/440, 400, 403, 444, 358/448

[56] References Cited

U.S. PATENT DOCUMENTS

| | | | |
|---|---|---|---|
| 4,352,012 | 9/1982 | Verderber et al. | 358/403 |
| 4,942,479 | 7/1990 | Kanno | 358/453 |
| 5,001,572 | 3/1991 | Hashimoto et al. | 358/400 |
| 5,103,490 | 4/1992 | McMillin | 382/62 |
| 5,132,809 | 7/1992 | Kikuchi et al. | 358/403 |

OTHER PUBLICATIONS

Xerox 3010 Facsimile Terminal Operator Manual, May 1990.

Primary Examiner—Edward L. Coles, Sr.
Assistant Examiner—Jerome Grant, II
Attorney, Agent, or Firm—Finnegan, Henderson, Farabow, Garrett & Dunner

[57] ABSTRACT

A facsimile network system capable of carrying out broadcast communication which enables documents in a memory of a key station to be sent automatically to multiple remote receiving stations at regular intervals. A sending sheet which is attached to the documents as a first page including names (addresses) of the key station (sender) and the remote receiving stations, date and message, is automatically prepared in the facsimile machine, so that it is transmitted together with the documents.

10 Claims, 10 Drawing Sheets

| NO | TEL. NO. | SENDER'S NAME |
|---|---|---|
| 0 | 270-1211 | ○○ CO.,LTD. |
| 1 | 503-3111 | ○○ CORP. |
| 2 | ------- | ------------ |
| 3 | ------- | ------------ |

FIG. 4

DATE

ADDRESS

SENDER'S NAME

THANK YOU -----

| NO | MESSAGE SAMPLES |
|---|---|
| 1 | THANK YOU FOR ALLOWING US TO HANDLE -----. WE WILL REPLY TO YOUR INQUIRY AS FOLLOWS. |
| 2 | THANK YOU FOR -----. THE FOLLOW IS OUR ESTIMATE FOR -----. |
| 3 | WE ARE PLEASE TO SEE YOUR PROSPERITY -----. |

FACSIMILE NETWORK SYSTEM CAPABLE OF CARRYING OUT BROADCAST COMMUNICATION

BACKGROUND OF THE INVENTION

This invention relates to a facsimile network system capable of carrying out broadcast communication which enables documents in a memory of a key station to be sent automatically to multiple remote receiving stations (a group of telephone numbers) at regular intervals. More particularly, the invention concerns an automatic sending sheet forming system capable of automatically forming a sending sheet including the addresses (names) of a sender (key station) and remote receiving stations, date/time and a message, which is transmitted prior to the original document. (hereinafter referred to merely as "a sending sheet forming system", when applicable).

For instance in a facsimile broadcast communication, the remote receiving stations are clarified by enabling send header indicating the remote receiving stations to be recorded on the top of each document or by sending the document together with a sending sheet indicating the remote receiving stations. These type conventional systems or methods have been proposed in Published Unexamined Japanese Patent Application No. sho-63-9061 and Published Examined Japanese Patent Application Nos. sho-63-33821 and Hei-1-23027.

In these publications, data as to original documents (sending original data) are first stored in an image memory, and the telephone numbers and addresses of remote receiving stations are then stored in a remote station memory. Thereafter, for every communication, a remote station's telephone number and address are read out of the remote station memory so as to be combined with the sending original data read out of the image memory. As a result, the sending original data is formed which is obtained by incorporating the address data to the header of the sending original document. The sending original data thus formed is sent to the remote receiving stations through the lines.

Further, there is another Published Unexamined Japanese Patent Application No. Sho-63-9365 disclosing a conventions system in which when the presence of a communication form is entered in an OMR sheet, communication form data and image data which have been read and stored before, are successively sent out.

The former convention systems are disadvantageous in that the sending original data formed is such that address data are only added to the header of a sending original document as was described above; that is, the amount of data is excessively small for a sending sheet. More specifically, it is impossible to form a sending sheet which includes, for instance, a greeting message expressing the feeling of the user (a calling party) sufficiently.

The latter one is also disadvantageous in that it is necessary to read the OMR sheet for every communication, and it is troublesome to for the OMR sheets. Further, a relatively long period of time is require to read the OMR sheet. Moreover, the conventional systems are low in operability, because the operator must enter an address in the communication form by himself.

SUMMARY OF THE INVENTION

Accordingly, an object of this invention is to eliminate the above-described difficulties accompanying conventional systems or methods of forming a sending sheet for broadcast communication. More specifically, an object of the invention is to provide a system of forming a sending sheet in broadcast communication in which transmission can be made with addresses entered automatically in a sending sheet having a sufficiently large amount of data.

In order to achieve the above-described object of the invention, the following systems have been provided according to the invention:

A facsimile network system capable of carrying out broadcast communication which enables documents in a memory of a key station to be sent automatically to multiple remote receiving stations comprises: an input means for designating the remote receiving stations and for reading the documents; a first memory means for storing at least addresses and telephone numbers of said remote receiving stations to which said documents are transmitted through the facsimile network; a second memory means for temporarily storing data as to the documents which are read out by said input means; a combining means for inserting at least an address read out of said first memory means into a sending sheet format which is obtained from the data stored at an address designated by said input means in said second memory means, to complete a sending sheet to be sent to each of said remote receiving stations as a front page of the documents; and a control means for controlling the broadcast communication according to the telephone numbers stored in said first memory, so that the documents are sent to each of the designated remote receiving stations together with the sending sheet.

BRIEF DESCRIPTION OF THE DRAWINGS

In the accompanying drawings:

FIGS. 11, 11a and 11b are explanatory diagram showing an example of the sending sheet employed in the third embodiment;

DESCRIPTION OF THE PREFERRED EMBODIMENTS

The invention will be described with reference to the accompanying drawings in detail.

Figure 2:
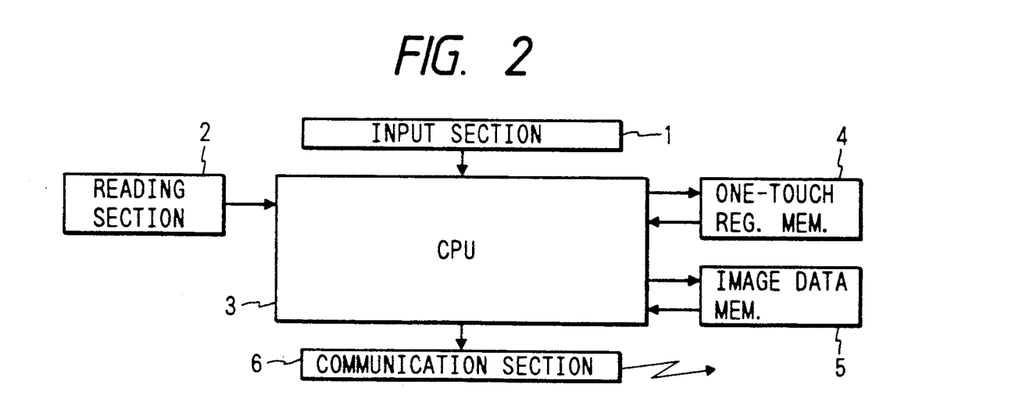
FIG. 2 is a block diagram outlining the arrangement of the system shown in FIG. 1.

FIG. 2 is a block diagram outlining the arrangement of an example of a sending sheet forming system which constitutes a first embodiment of the invention.

In FIG. 2, reference numeral 1 designates an input unit such as a control panel on which a key board including one-touch keys or speed-dial keys (hereinafter referred to as "one-touch keys", when applicable) is mounted; 2, a reading unit such as a scanner; and 3, a control unit (CPU) for controlling communication operations such as ordinary facsimile communication, broadcast communication and the like and for controlling the storing and reading of data as to sending sheets and original documents.

Figure 3:
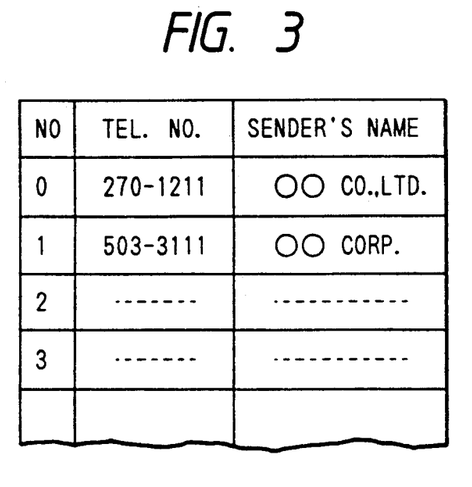
FIG. 3 is an explanatory diagram showing one example of a sending sheet employed in the system.

Further in FIG. 2, reference numeral 4 designates a one-touch key register memory. A table as shown in FIG. 3 is stored in the on-touch key register memory 4 in which telephone numbers (TEL. NO) and addresses are listed in correspondence to the one-touch keys. The table is registered by the user with the input unit 1 in advance.

Further in FIG. 2, reference numeral 5 designates an image data memory for temporarily storing the original document data read out of the reading unit 2; and 6, a communication unit for calling remote receiving stations or performing a protocol communication.

Figure 1:
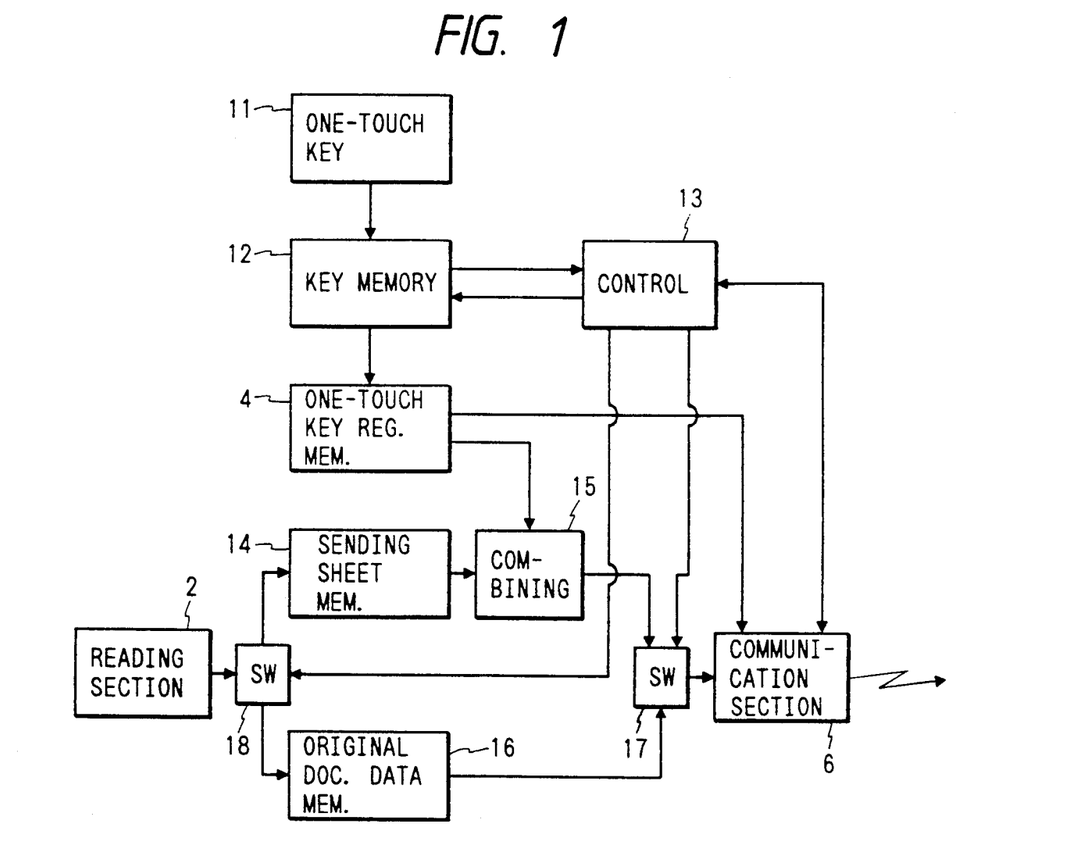
FIG. 1 is a block diagram for a description of the function of an embodiment of a sending sheet forming system which constitutes a first embodiment of this invention.

The operation of the system shown in FIG. 2 will be described with reference to FIG. 1 showing a functional block diagram thereof.

In FIG. 1, reference numeral 11a designates a one-touch key section of the input unit 1; 12, a key memory section for storing a key number inputted with the one-touch key section 11a; and 13, a control section which determines it from the storage of a plurality of key numbers in the key memory section 12 that broadcast communication is required. The control section 13 controls various circuit elements as described later.

Figure 4:
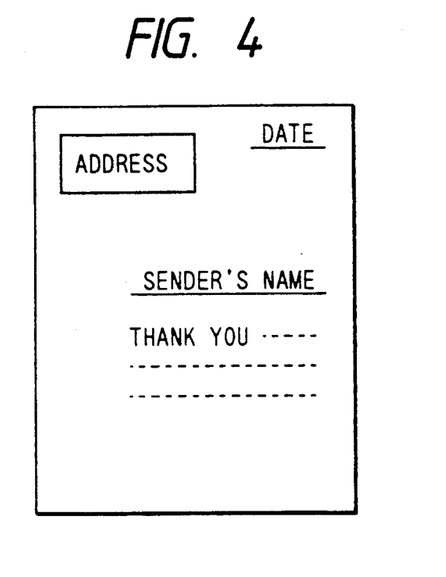
FIG. 4 is an explanatory diagram showing an example of the format of the sending sheet.

Further in FIG. 1, reference numeral 14 designates a sending sheet memory section for storing the data as to sending sheets read with the reading section 2. An example of the format of the sending sheet is as shown in FIG. 4, including "a space assigned to the address of remote receiving stations (address space)" other than "date", "station's name sending the documents (sender's name)", and "greeting message". Reference numeral 15 designates a combining section for entering in the "address space" the address obtained from the one-touch key registration memory 4; 16, an original document data memory section; and 17 and 18, switching sections.

Figure 5:
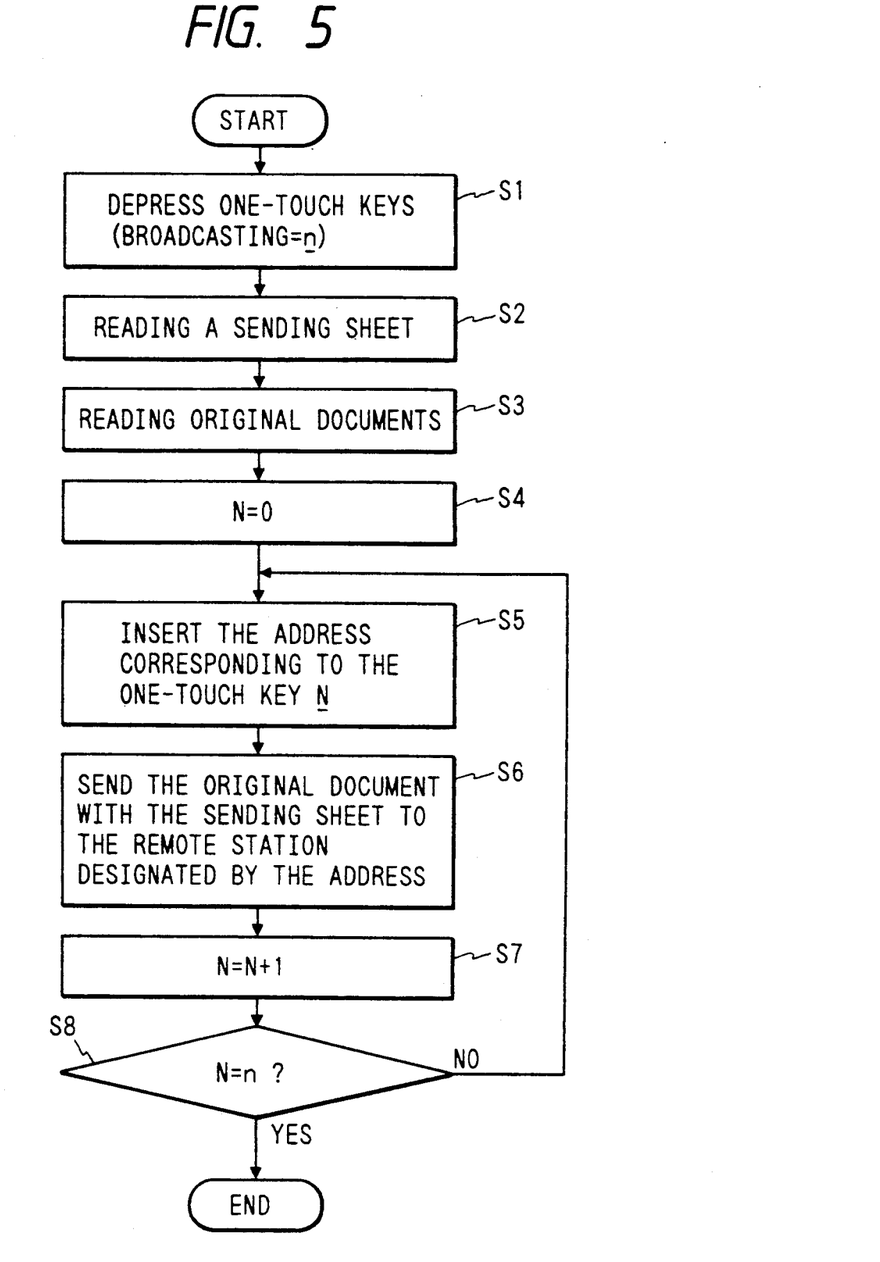
FIG. 5 is a flow chart for a description of the operation of the first embodiment.

The operation of the embodiment will be described with reference to FIG. 1 and a flow chart shown in FIG. 5.

First, the one-touch keys of remote stations to be called by broadcasting are depressed in the one-touch key section 11. (Step S1) Assuming that one-touch keys are depressed, the n numbers of the depressed one-touch keys are stored in the key memory section 12. In this case, if at least two one-touch key numbers are stored in the key memory section 12, the control section 13 determines it from the storage of the one-touch key numbers that broadcast communication is to be carried out so that the control section 13 commences the control operation for the broadcast communication. It may be carried out to start the broadcast communication by depressing an instruction key for instructing the broadcast communication, which is provided to the input unit 1.

The control section 13 causes the switching section 18 to connect the reading section 2 to the sending sheet memory section 14, so that the first original document data read through the reading section 2 (i.e., the sending sheet) is stored in the sending sheet memory section 14. (Step S2) Thereafter, the control section 13 causes the switching section 18 to connect the reading section 2 to the original document data memory section 16, so that original document data read through the reading section 2 (i.e., a sending original document) is stored in the original document data memory section 16. (Step S3)

Thereafter, the control section 13 applies a transmission start instruction signal to the communication unit 6, and also applies an instruction signal to the key memory section 12 to cause the latter 12 to output the first key number. The first key number thus outputted is applied to the one-touch key registration memory 4. In response to the first key number, the one-touch key registration memory 4 outputs the corresponding telephone number and address. The telephone number is applied to the communication unit 6, while the address is applied to the combining section 15. The communication unit 6 automatically dials the telephone number to connect the telephone line to the called remote station.

Next, the control section 13 causes the switching section 17 to connect the combining section 15 to the communication means 6. The combining section 15 inserts in the address space of the sending sheet the first address obtained from the one-touch key registration memory 4, and applies it through the communication unit 6 to the telephone line. Subsequently, the switching section 17 operates to connect the original document data memory section 16 to the communication means 6, so that the original document data is transmitted through the telephone line. (Steps S5 to S8)

When one communication has been accomplished in the above-described manner, the communication unit 6 applies a transmission completion signal to the control section 13. In response to the transmission completion signal, the control section 13 applies an instruction signal to the key memory section 12 to read the next key number. In response to the instruction signal, the key memory section 12 outputs the second key number to be applied to the one-touch key registration memory 4. In response to the second key number, the one-touch key registration memory 4 outputs the corresponding telephone number and address to the communication unit 6 and the combining section 15, respectively. As is similar to the above, the communication unit 6 automatically dials the telephone number, while the combining section 15 inserts the address in the address space of the sending sheet. The sending sheet is first applied to the telephone line through the communication unit 6, and then the original document data is applied to the telephone line. As a result, the transmission of data to the second address is completed.

The above-described operations are carried out repeatedly as many times as the number n of one-touch keys inputted in Step S1. That is, Steps S5 through S8 are repeatedly carried out until N=n is obtained. Thus, the above-described series of operations have been accomplished.

In the embodiment, as is apparent from the above description, the addresses corresponding to the one-touch keys 11a operated in Step S1 are automatically read out of the onetouch key registration memory 4 one at a time, and each of the addresses is inserted in the address space of the sending sheet, and the sending sheet thus processed is transmitted prior to the original document data.

Hence, it is possible for the operator to prepare sending sheets each having a remote receiving station's address automatically by way of merely operating the one-touch key section to select desired remote receiving stations. In addition, it is also possible for the operator to prepare a sending sheet format which includes a greeting message or the like, and therefore it is advantageous in that the sending sheet could contain a sufficient amount of message according to the operator's requirement.

Now, a second embodiment of the invention will be described with reference to FIGS. 6 to 8.

Figure 6:
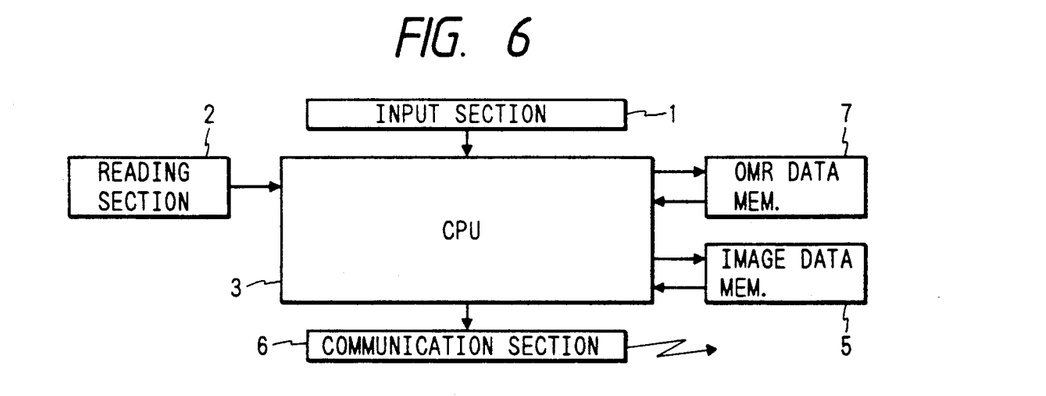
FIG. 6 is a block diagram showing the arrangement of another example of the sending sheet forming system which constitutes a second embodiment of the invention.

FIG. 6 is a block diagram showing the arrangement of another example of the sending sheet forming system which constitutes a second embodiment of the invention. The second embodiment is different from the first embodiment of FIG. 2 in that an OMR data memory 7 is provided to temporarily store the data which are obtained by reading in the reading unit 2 and then analyzing the thus read data in the control unit 3, and that the control means 3 is adapted to have an OMR sheet analyzing function.

Figure 7:
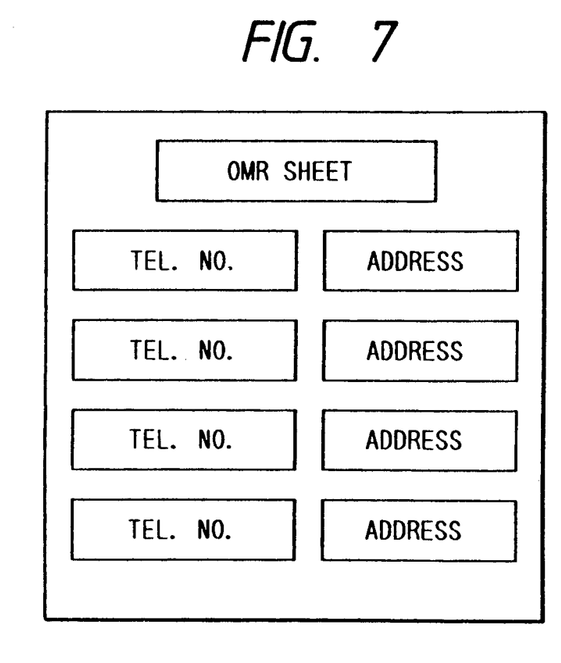
FIG. 7 is an explanatory diagram outlining data listed on an OMR sheet.
Figure 8:
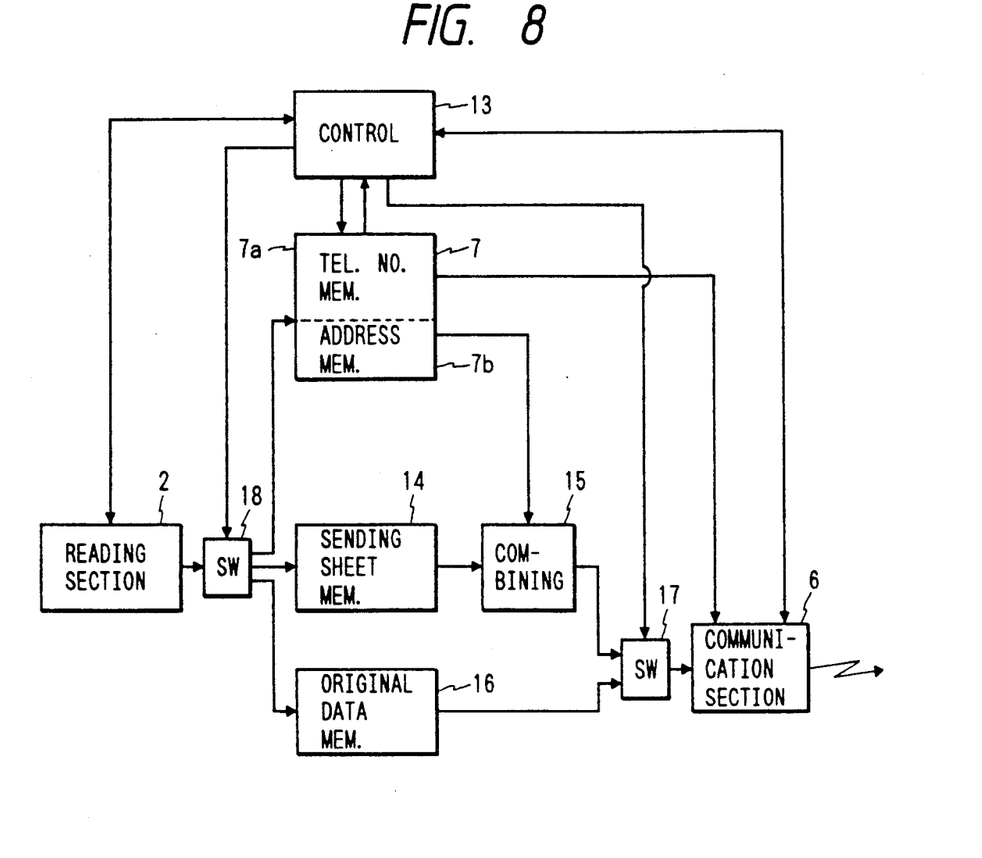
FIG. 8 is a block diagram for a description of the function of the system shown in FIG. 6.

An example of such an OMR sheet is as shown in FIG. 7. The OMR sheet, as shown in FIG. 7, has a plurality of telephone number spaces (TEL. NO.) and a plurality of address spaces corresponding to the telephone number spaces, respectively. The user can enter desired telephone numbers for the broadcast communication and their addresses in these spaces.

The operation of the second embodiment will be described with reference to FIG. 8, a functional block diagram.

First, an OMR sheet is subjected to a reading processing in the reading unit 2 to obtain a plurality of telephone numbers and a plurality of addresses listed thereon. Upon determination of the reading of the OMR sheet, the control section 13 causes the switching section 18 to connect the reading section 2 to the OMR data memory 7, so that the data of the OMR sheet are stored in the OMR data memory 7. The telephone numbers listed on the OMR sheet are stored in a telephone number memory section 7a, while the addresses listed on the OMR sheet are stored in an address memory section 7b. The control section 13 determines it from the storage of at least two telephone numbers in the telephone number memory section 7a that broadcast communication is required.

Thereafter, when reading the second original document, namely, the sending sheet (cf. FIG. 4) with the reading section 2 is started, the switching section 18 is operated to connect the reading section 2 to the sending sheet memory section 14 so as to store the sending sheet data in the sending sheet memory section 14.

Thereafter, the third original document, namely, sending original document data is read with the reading section 2, and the switching section 18 is operated to connect the reading section 2 to the original document data memory section 16 so as to store the sending original data in the original document data memory section 16.

After the above-described operation, the control section 13 applies the transmission start instruction to the communication unit 6 so as to read a telephone number out of the telephone number memory section 7a. As a result, the communication unit 6 automatically dials the telephone number, connecting the telephone line to the called remote receiving station.

Next, the control section 13 cause a switching section 17 to connect the combining section 15 to the communication unit 6. The combining section 15 reads the format of the sending sheet stored in the sending sheet memory section 14, and insert the address read out of the address memory section 7b in the address space of the format, and applies it to the communication unit 6 so that the sending sheet is first transmitted to the called remote station through the telephone line.

Thereafter, the switching section 17 is operated to connect the original document data memory section 16 to the communication section 6, so that the original document data read from the original document data memory section 16 is transmitted to the called station through the communication unit 6.

When one communication has been accomplished in the above-described manner, a transmission completion signal is applied to the control section 13. Upon reception of the transmission completion signal, the control section 13 operates to apply the next telephone number from the telephone number memory section 7a to the communication unit 6, thus starting the broadcasting of data to the next called remote receiving station.

The above-described operations are carried out repeatedly as many times as the number of telephone numbers stored in the telephone number memory section 7a. When all the telephone numbers have been dialed in the above-described manner, the broadcast communication is terminated.

In the second embodiment, broadcasting telephone numbers and addresses are entered in an OMR sheet, and the OMR sheet is read with the reading section 2, as a result of which an address is automatically entered in the sending sheet. Therefore, with the second embodiment, the same effects can be expected as with the first embodiment.

Now, a third embodiment of the invention will be described.

Figure 9:
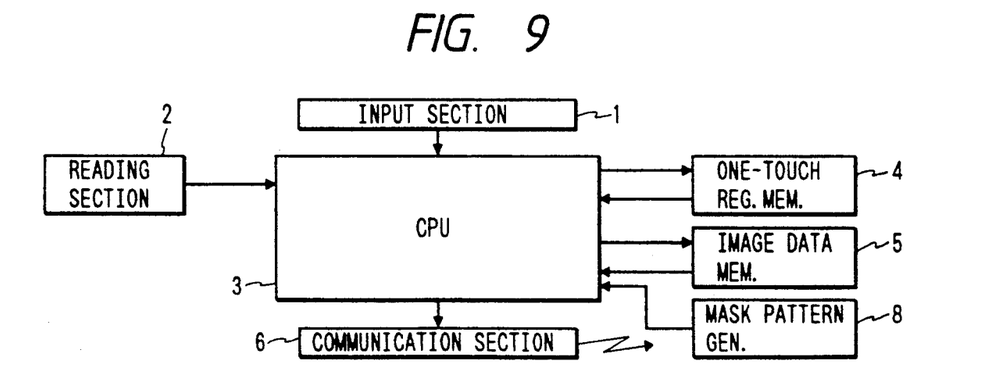
FIG. 9 is a block diagram showing the arrangement of the other example of the sending sheet forming system which constitutes a third embodiment of the invention.

FIG. 9 is a block diagram showing the arrangement of another example of the sending sheet forming system, which constitutes the third embodiment of the invention. In FIG. 9, reference numeral 8 designates a mask pattern generating section, and the remaining reference numerals 1 through 6 designate parts which are equal to or correspond functionally to those which have been designated by the same reference numerals in FIG. 2.

Figure 10:
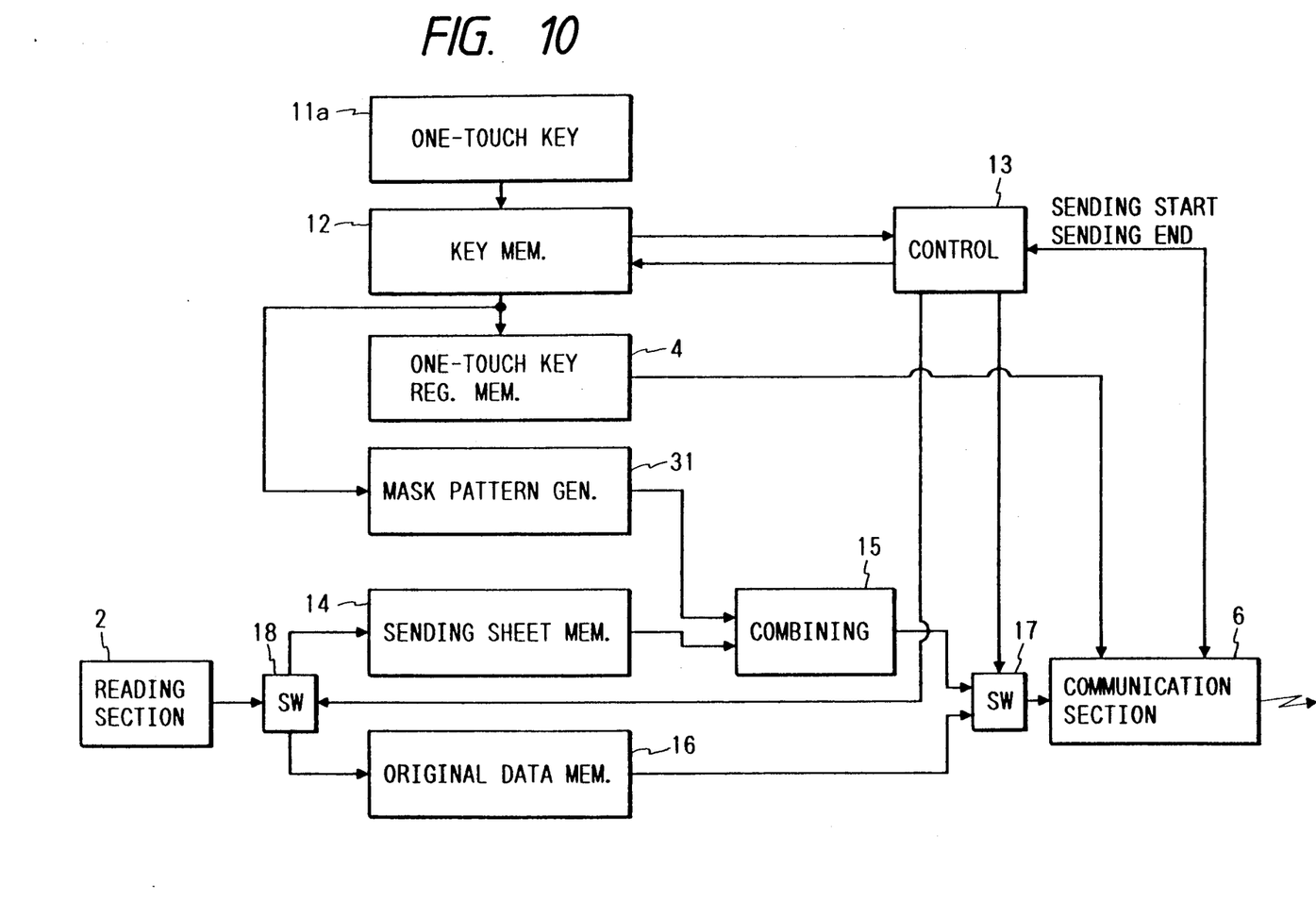
FIG. 10 is a block diagram for a description of the function of the system shown in FIG. 9.

The operation of the system shown in FIG. 9 will be described with reference to FIG. 10, a functional block diagram. In the third embodiment, a sending sheet format is employed which has a plurality of addresses entered in its predetermined space as shown in FIG. 11(a).

Similarly as in the case of the first embodiment, the one-touch keys 11a of the one-touch key section 11 corresponding to remote stations to be called by broadcasting are depressed; that is, the key numbers of called remote stations are selected. The key numbers thus inputted are stored in the key memory section 12. When a plurality of key numbers are stored in the key memory section 12, the control section 13 determines it from the storage of plural key numbers that broadcast communication is required, and starts a broadcasting procedure. In the embodiment, the one-touch keys 11a of the one-touch key section 11 are depressed in the order of the encircled numbers set beside the addresses listed on the sending sheet format.

Figure 11A:
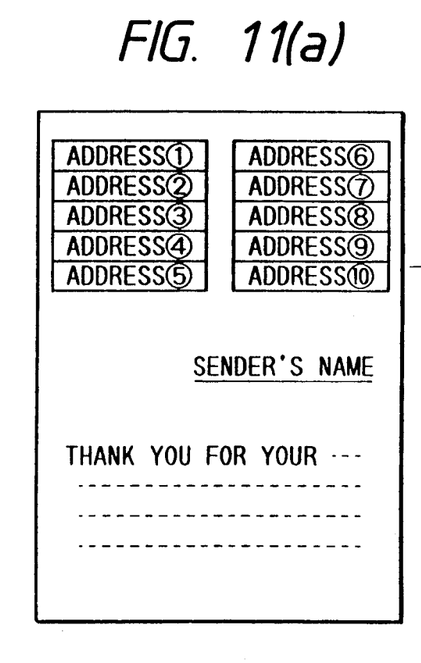

When the first original document which is a sending sheet format shown in FIG. 11(a) including the plurality of addresses is read, the switching section 18 is operated to connect the reading section 2 to the sending sheet memory section 14, so that the sending sheet format is stored in the sending sheet memory section 14.

Thereafter, when the second original document; i.e., sending original document data is read, the switching section 18 is operated to connect the reading section 2 to the original document data memory section 16, so that the sending original data is stored in the original document data memory section 16.

Upon completion of the original document data reading operation, the control section 13 applies a transmission start signal to the communication unit 6 and simultaneously operates to read the first key number from the key memory section 12 to apply to the one-touch key registration memory 4, so that the corresponding telephone number is read out of the one-touch key registration memory 4 to be applied to the communication unit 6. Then, the latter 6 automatically dials the telephone number, connecting the telephone line to the called remote station.

The key number read out of the key memory section 12 is further applied to the mask pattern generating section 31. In response to the key number, the mask pattern generating section 31 forms data to mask all the addresses in the address space of the sending sheet except the address (1). The data thus formed is applied to the combining section 15. As a result, the combining section 15 outputs a sending sheet with the address (1). The sending sheet thus outputted is applied through the switching section 17 to the communication unit 6 so as to be applied to the telephone line.

Thereafter, the switching section 17 is operated to connect the original document data memory section 16 to the communication unit 6, so that the original document data read from the original document data memory section 16 is applied to the telephone line following the sending sheet.

When the transmission of data to the first called station is accomplished in the above-described manner, the communication unit 6 applies a transmission completion signal to the control section 13. In response to the signal, the control section 13 starts the transmission of data to the second remote receiving station. And the above-described operations are carried out again.

Figure 11B:
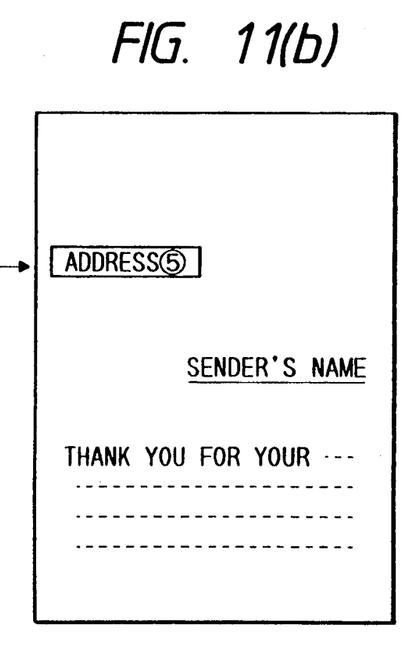

FIG. 11(b) shows an example of the sending sheet in which all the addresses are masked except the address (5).

As is apparent from the above description, in the third embodiment, only one sending sheet format including all of desired remote receiving stations, addresses is employed. That is, in the embodiment, after the sending sheet format is read with the reading section, a sending sheet with an address can be transmitted to each of the remote receiving stations through broadcast communication. Hence, a sending sheet including a desired greeting sentence or the like can be readily formed for the broadcast communication.

Next, while the desired message is read as a part of the sending sheet format in the reading section 2 in the above described embodiments, the followings are examples for selecting one of preferred message examples to be inserted into the sending sheet format with ease and quickly.

Figure 13:
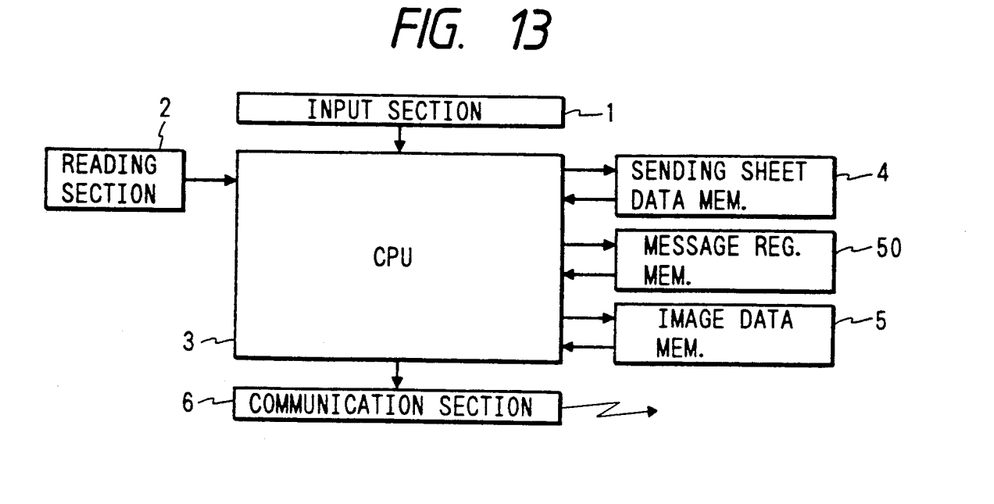
FIG. 13 is a block diagram showing the arrangement of the first example of FIG. 12.

FIG. 13 is a block diagram showing the arrangement of an example of a sending sheet forming system which constitutes a fourth embodiment of the invention. In FIG. 13, the same reference numerals as those of FIG. 1 designate the same or corresponding elements, respectively. Reference numeral 14 designates a sending sheet data memory similar to that of FIG. 2 and reference numeral 50 designates a message registration memory which stores a plurality of message patterns.

Figure 14:
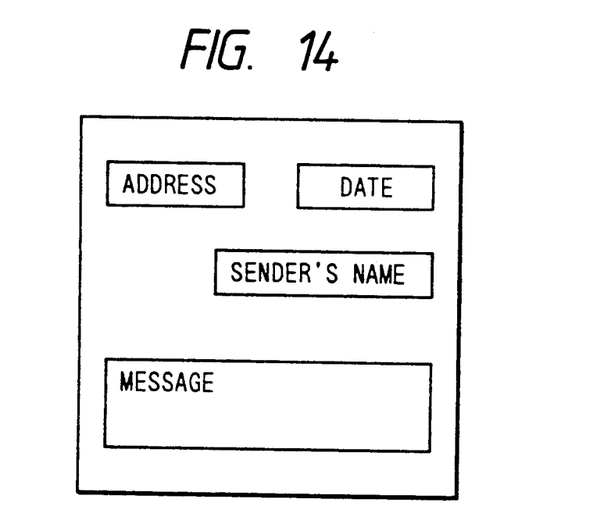
FIG. 14 is an explanatory diagram showing an example of a sending sheet format.

FIG. 14 shows an example of a sending sheet format stored in the sending sheet data memory 14. The sending sheet shown in FIG. 14 has a message space, a data space, etc. which are blank.

Figure 15:
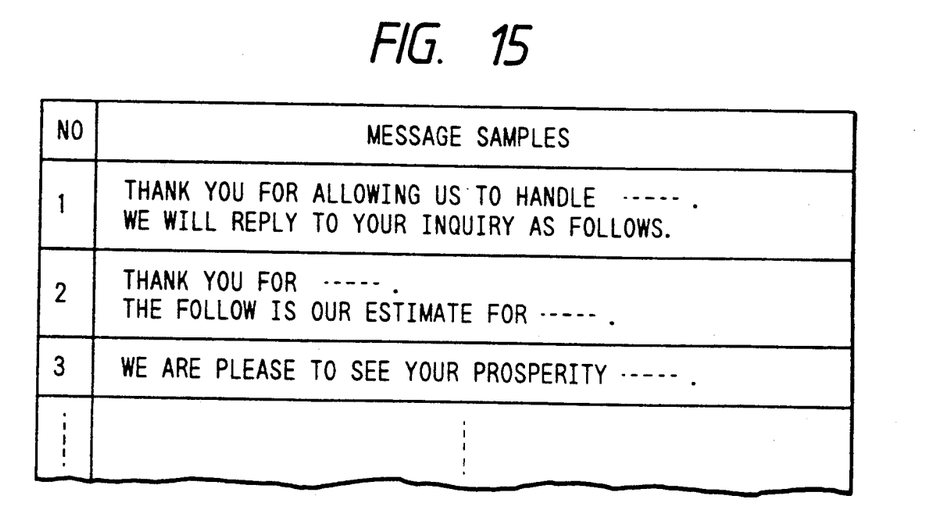
FIG. 15 is an explanatory diagram showing various message sentences included in the sending sheet.

FIG. 15 shows examples of the message patterns stored in the message sentence registration memory 50.

The sending sheet forming system will be described with reference to FIG. 12, a functional block diagram, in more detail.

Figure 12:
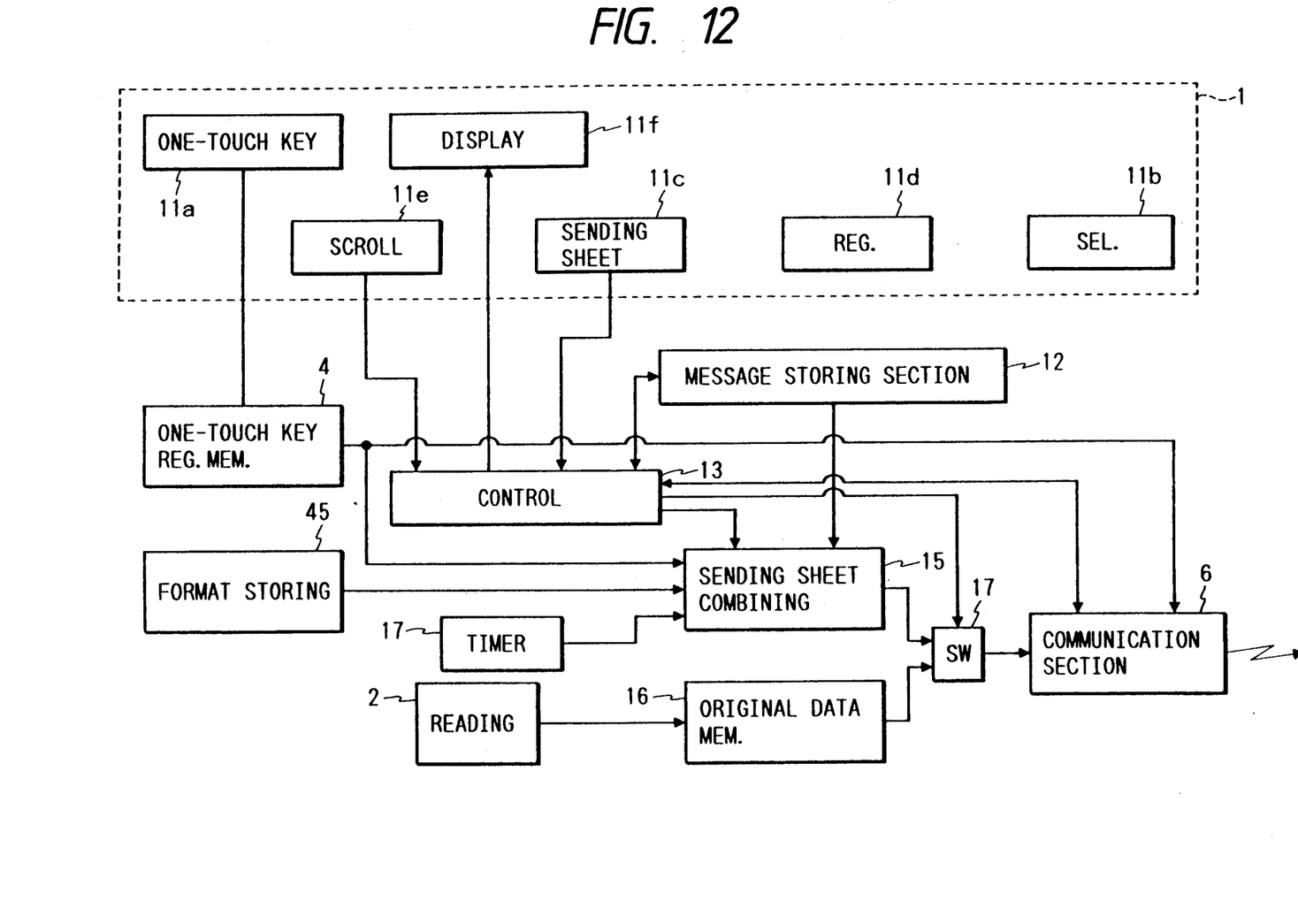
FIG. 12 is a functional block diagram for a description of the operation of a first example of a system for inputting data representing contents of the sending sheet.

In FIG. 12, the input unit 1 includes one-touch keys 11a, a selection key 11b, a sending sheet inserting key 11c, a registration key section 11d, a scroll key 11e and a display section 11f and a message storing section 12 stores a plurality of message examples as shown in FIG. 15. The message examples are inputted with the registration keys in the registration key section 11d.

Further in FIG. 12, a format storing section 45 stores at least one sending sheet format which is read out by the reading unit 2 in the first embodiment, and a sending sheet forming section 15 has the substantially same function as the combining unit 15 of FIG. 1. In addition, a timer 17 is provided to input data as to the date to the sending sheet forming section 15.

The operation of the sending sheet forming system thus organized will be described.

First, a plurality of message samples are stored in the message storing means 40 by operating the registration key section 11d on the input unit 1. The registration key section 11d includes keys for inputting message samples in the form of codes, and function keys for specifying registration operations. Therefore, the codes, or the image data obtained by converting the codes are stored in the message storing unit 12. The message samples are as indicated, for instance, in FIG. 15.

The operation of forming a sending sheet with some message will be described.

First, an operation will be described in which, among the message samples stored in the message storing section 40, a desired one is selected.

Upon depression of the sending sheet inserting key 11c, the control section 13 causes the display section 11f to display part or the whole of the message sample No. 1 stored in the message storing section 12. When the message sentence thus displayed is not the desired one, the operator turns on the scroll key 11e, so that part or the whole of another message sample No. 2 is displayed on the display unit 11f.

In the embodiment, whenever the scroll key 11e is depressed, a message sample different from the previous one appears on the display unit 11f. Finding the desired message sample, the operator turns on the selection key 11b, so that the message sample is transferred from the message storing means 12 to the sending sheet forming section 15. Thereafter, a communication start instruction is issued, whereupon an original set in the reading section 2 is read, and the original data is stored in the original data memory section 16. On the other hand, the corresponding telephone number is read out of the one-touch key registration memory 4 and applied to the communication unit 6. As a result, the communication means 6 automatically dials the telephone number, sending a calling signal to the called remote receiving station.

Thereafter, the sending sheet forming section 15 reads a sending sheet format from the format storing section 45, and inserts the called remote station's name read from the onetouch key registration memory 4, the message read from the message storing unit 12, and the date outputted by the timer 17 into the sending sheet format thus read, to form a sending sheet.

When, in response to the calling signal, the called remote receiving station is connected to the telephone network, the control section 13 causes the switching section 17 to connect the sending sheet forming section 15 to the communication unit 6, so that the sending sheet thus formed is transmitted to the called remote receiving station before sending the documents.

Upon completion of the transmission of the sending sheet, the switching section 17 is operated to connect the original document data memory section 16 to the communication unit 6. As a result, the original data which is read from the original data memory section 16 is transmitted to the called remote station through the telephone network.

Thus, the sending sheet and the original data have been transmitted to the called station.

In the above-described embodiment, among the plurality of message samples, a desired message sample can be obtained by scrolling them. Hence, even if the correspondence of the plurality of message samples with the numbers applied thereto is unknown, the desired message sample can be obtained readily and quickly.

While a plurality of message samples are stored in the message storing section 12 operating the keys on the input unit 1 in the above embodiment, a document containing a plurality of message samples may be subjected to the read operation in the reading section 2 to read out the plurality of message samples to be stored in the message storing unit 40 temporarily.

Figure 16:
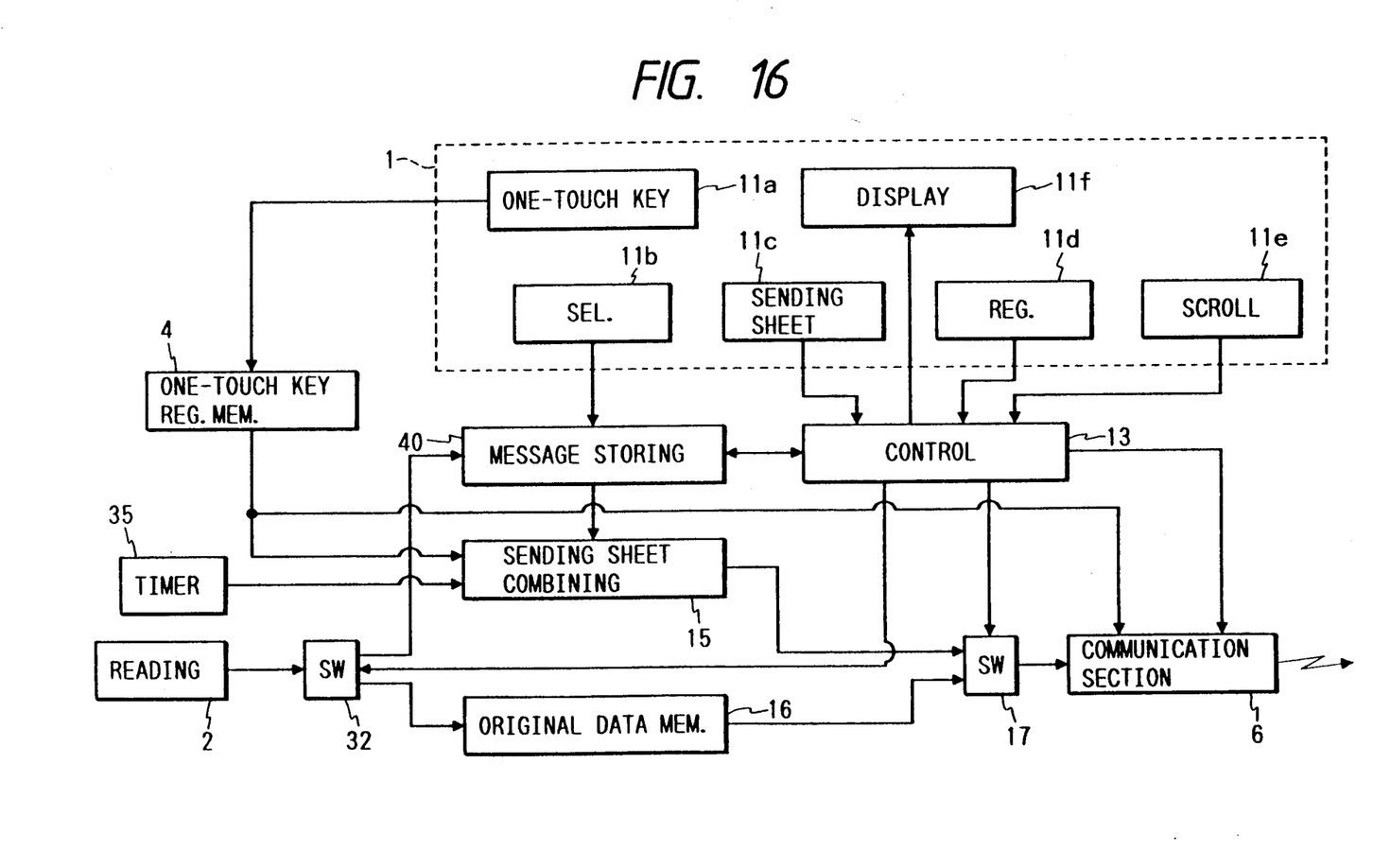
FIGS. 16 and 17 are functional block diagrams for a description of the operations of second and third examples of the data input system, respectively.

When a registration instruction is issued by the registration key section 11d on the input unit 1, the control section 13 causes the switching section 32 to connect the reading section 2 to the message storing section 40. Next, an original set in the reading section 2; i.e., a document containing a plurality of message samples is read, and stored, as image data, in a predetermined memory area of the message storing unit 40.

Among the message samples stored in the message storing section 40, a desired one can be selected by operating the scroll key 11e and the selection key 11b similarly as in the above described embodiment.

In order to insert the addresses of the sender and the remote receiving stations, the table as shown in FIG. 3 is employed in the above described embodiments, in which telephone numbers (TEL. NO) and addresses are listed in correspondence to the one-touch keys. The table is registered by the user with the input unit 1 in advance. It is considered to scroll the lists contained in the table in order to readily select desired one from the lists of the addresses to be inserted into the sending sheet format of FIG. 14.

Figure 17:
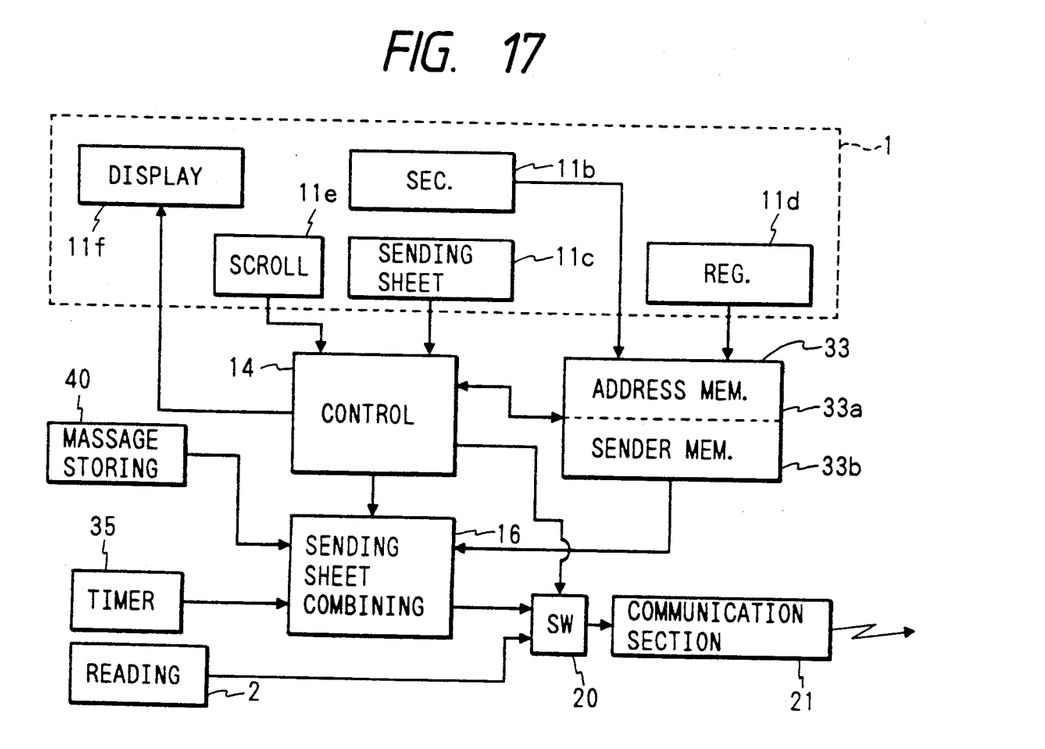

The scrolling system will be described with reference to FIG. 17 in which the one-touch register memory 4 is replaced by a memory section including a remote station address memory 33a and a sender address memory 33b storing the name of sender and those of the remote stations, respectively.

When an operation of transmitting original data to a remote receiving station is carried out by operating the sending sheet inserting key 11c etc. on the input unit 1, the control section 14 reads the remote station's name (address) from the memory 33a to display on the display section 11f. When the remote station's name thus displayed is different from the desired one, the operator operates the scroll key 11e. As a result, the next station's name is displayed on the display section 11f. The scroll key is repeatedly operated until the desired station's name is displayed on the display section 11f. When the desired one is displayed, the selection key 11b is operated, so that the name thus displayed is read and applied to the sending sheet forming section 15.

Upon completion of the selection of the desired station's name, senders' names are displayed on the display unit 11f. Similarly as in the above-described case, the senders' names thus displayed can be scrolled by operating the scroll key 11e. When a desired sender's name is displayed, the selection key 11b is operated, so that the desired one is read and applied to the sending sheet forming section 15.

As was described above, the remote receiving stations' names and the senders' names are displayed on the display section 11f, and among them, desired ones are selected by scrolling them on the display section. Hence, selection of names can be achieved with ease.

According to the invention, a sending sheet can be formed which includes a sufficient amount of data. Therefore, the user can perform broadcast communication using a sending sheet which is made to his satisfaction.

Furthermore according to the invention, addresses are automatically entered in the address space of a sending sheet in facsimile broadcast communication. Therefore, by preparing only one sending sheet having a blank address space, the user can perform facsimile broadcast communication with a sending sheet.

What is claimed is:

1. A facsimile network system capable of carrying out broadcast communication which enables documents in a memory of a key station to be sent automatically to multiple remote receiving stations comprising:
   an input means for designating the remote receiving stations and for reading the documents;
   a first memory means for storing at least addresses and telephone numbers of said remote receiving stations to which said documents are transmitted through the facsimile network;
   a second memory means for temporarily storing data as to the documents which are read out by said input means;
   a combining means for inserting at least an address read out of said first memory means into a sending sheet format which is obtained from the data stored at an address designated by said input means in said second memory means, to complete a sending sheet to be sent to each of said remote receiving stations as a front page of the documents;

a control means for controlling the broadcast communication according to the telephone numbers stored in said first memory, so that the documents are sent to each of the designated remote receiving stations together with the sending sheet;

said control means determining on the basis of the number of designated remote receiving stations that broadcast communication is required;

said input means comprising a key board for inputting numbers corresponding to the remote receiving stations to designate the stations and a reading means for reading the document including the sending sheet format to store the data thus read in said second memory means; and a third memory means for storing at least a plurality of message samples; and said input means further comprising: a display means for displaying said message samples; means for scrolling said message samples displayed on said display means; means for selecting a desired one out of said message samples thus displayed; and means for inserting said desired message thus selected into the sending sheet format in said combining means.

2. A facsimile network system as defined in claim 1 wherein said second memory means comprises a sending sheet format memory for storing the sending sheet format read by said reading means and a original document data memory for storing the original documents other than the sending sheet format read by said reading means.

3. The facsimile network system as defined in claim 1 wherein all addresses of the designated remote receiving stations are listed in the sending sheet format which is read by said reading means, sand said facsimile network system further comprising: means for masking all said addresses on the sending sheet format except one address of the designated station for every communication in broadcast communication.

4. The facsimile network system as defined in claim 1 wherein the sending sheet format contains at least one address of the designated remote receiving station, the address of a sender and a message.

5. The facsimile network system as defined in claim 1 wherein said first memory means comprises an OMR data memory for storing the telephone numbers and addresses of the designated remote receiving stations to be called by broadcast communication, the telephone numbers and addresses thereof being read by said input means from an OMR sheet, and wherein said combining means inserts the address read out of said first memory means into the sending sheet format to complete the sending sheet to be sent to each of said remote receiving stations as a front page of the documents.

6. The facsimile network system as defined in claim 5 wherein said OMR sheet contains data as to the telephone numbers and addresses of the designated remote receiving stations.

7. A facsimile network system capable of carrying out broadcast communication which enables documents in a memory of a key station to be sent automatically to multiple remote receiving stations comprising:

an input means for designating the remote receiving stations and for reading the documents;

a first memory means for storing at least addresses and telephone numbers of said remote receiving stations to which said documents are transmitted through the facsimile network;

a second memory means for temporarily storing data as to the documents which are read out by said input means;

a combining means for inserting at least an address read out of said first memory means into a sending sheet format which is obtained from the data stored at an address designated by said input means in said second memory means, to complete a sending sheet to be sent to each of said remote receiving stations as a front page of the documents;

a control means for controlling the broadcast communication according to the telephone numbers stored in said first memory, so that the documents are sent to each of the designated remote receiving stations together with the sending sheet;

said input means inputting an instruction signal for the broadcast communication to said control means;

said input means comprising a key board for inputting numbers corresponding to the remote receiving stations to designate the stations and a reading means for reading the document including the sending sheet format to store the data thus read in said second memory means; and a third memory means for storing at least a plurality of message samples; and said input means further comprising: a display means for displaying said message samples; means for scrolling said message samples displayed on said display means; means for selecting a desired one out of said message samples thus displayed; and means for inserting said desired message thus selected into the sending sheet format in said combining means.

8. The facsimile network system as defined in claim 7 wherein all addresses of the designated remote receiving stations are listed in the sending sheet format which is read by said reading means, and said facsimile network system further comprising: means for masking all said addresses on the sending sheet format except one address of the designated station for every communication in broadcast communication.

9. The facsimile network system as defined in claim 7 wherein the sending sheet format contains at least one address of the designated remote receiving station, the address of a sender and a message.

10. The facsimile network system as defined in claim 7 wherein said second memory means comprises a sending sheet format memory for storing the sending sheet format read by said reading means and a original document data memory for storing the original documents other than the sending sheet format read by said reading means.

* * * * *